US009772678B2

(12) United States Patent
Sasanka et al.

(10) Patent No.: US 9,772,678 B2
(45) Date of Patent: *Sep. 26, 2017

(54) UTILIZATION OF PROCESSOR CAPACITY AT LOW OPERATING FREQUENCIES

(71) Applicant: Intel Corporation, Santa Clara, CA (US)

(72) Inventors: Ruchira Sasanka, Hillsboro, OR (US); Alexander Gendler, Kiriat Motzkin (IL); Udi Sherel, Natanya (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/139,455

(22) Filed: Apr. 27, 2016

(65) Prior Publication Data
US 2016/0313786 A1    Oct. 27, 2016

Related U.S. Application Data

(63) Continuation of application No. 14/933,378, filed on Nov. 5, 2015, now Pat. No. 9,361,234, which is a (Continued)

(51) Int. Cl.
*G06F 1/32*    (2006.01)
*G06F 1/26*    (2006.01)
(Continued)

(52) U.S. Cl.
CPC ............ *G06F 1/3296* (2013.01); *G06F 1/266* (2013.01); *G06F 1/324* (2013.01);
(Continued)

(58) Field of Classification Search
CPC .... G06F 12/084; G06F 12/0223; G06F 1/266; G06F 1/324; G06F 1/3296;
(Continued)

(56) References Cited

U.S. PATENT DOCUMENTS 4,827,149 A    5/1989  Yabe
5,091,661 A    2/1992  Chiang
(Continued)

FOREIGN PATENT DOCUMENTS

WO    2006072040    7/2006

OTHER PUBLICATIONS

European Patent Office, Extended European Search Report mailed Feb. 4, 2015, in European Patent Application No. 14186685.5.
(Continued)

*Primary Examiner* — Eric Oberly
(74) *Attorney, Agent, or Firm* — Trop, Pruner & Hu, P.C.

(57) ABSTRACT

In an embodiment, a processor includes one or more cores including a first core operable at an operating voltage between a minimum operating voltage and a maximum operating voltage. The processor also includes a power control unit including first logic to enable coupling of ancillary logic to the first core responsive to the operating voltage being less than or equal to a threshold voltage, and to disable the coupling of the ancillary logic to the first core responsive to the operating voltage being greater than the threshold voltage. Other embodiments are described and claimed.

17 Claims, 10 Drawing Sheets

Related U.S. Application Data continuation of application No. 14/039,368, filed on Sep. 27, 2013, now Pat. No. 9,256,276.

(51) Int. Cl.
    *G06F 12/02*         (2006.01)
    *G06F 12/084*       (2016.01)

(52) U.S. Cl.
    CPC ........ G06F 12/0223 (2013.01); G06F 12/084 (2013.01); *G06F 2212/62* (2013.01); *Y02B 60/1217* (2013.01); *Y02B 60/1285* (2013.01); *Y02B 60/32* (2013.01)

(58) Field of Classification Search
    CPC ............ G06F 2212/62; Y02B 60/1217; Y02B 60/1285; Y02B 60/32
    See application file for complete search history.

(56) References Cited

U.S. PATENT DOCUMENTS

| | | | |
|---|---|---|---|
| 7,647,452 B1* | 1/2010 | Moll | G06F 12/0802 711/118 |
| 2002/0140467 A1* | 10/2002 | Naffziger | G06F 1/3203 327/113 |
| 2003/0071657 A1* | 4/2003 | Soerensen | G06F 1/04 326/93 |
| 2004/0017234 A1* | 1/2004 | Tam | G06F 1/08 327/141 |
| 2004/0230849 A1 | 11/2004 | Dhong et al. | |
| 2006/0069903 A1* | 3/2006 | Fischer | G06F 21/57 713/1 |
| 2006/0085660 A1* | 4/2006 | Zagacki | G06F 1/32 713/322 |
| 2008/0077813 A1* | 3/2008 | Keller | G06F 1/3203 713/320 |
| 2009/0153210 A1* | 6/2009 | Wang | G06F 1/32 327/198 |
| 2009/0213668 A1* | 8/2009 | Zhang | G06F 12/0855 365/189.011 |
| 2009/0235099 A1* | 9/2009 | Branover | G06F 1/3203 713/322 |
| 2009/0319872 A1* | 12/2009 | Alrod | G11C 11/5642 714/773 |
| 2012/0005513 A1* | 1/2012 | Brock | G06F 1/3203 713/340 |
| 2012/0166854 A1 | 6/2012 | Rotem et al. | |
| 2013/0346781 A1* | 12/2013 | Chung | G06F 9/30 713/324 |
| 2014/0181557 A1* | 6/2014 | Branover | G06F 1/3234 713/323 |
| 2014/0189411 A1* | 7/2014 | Kanchana | G06F 1/3225 713/324 |
| 2014/0281625 A1* | 9/2014 | Younger | G06F 1/3206 713/323 |

OTHER PUBLICATIONS

Vinay Hanumaiah, et al: "Maximizing Performance of Thermally Constrained Multi-Core Processors by Dynamic Voltage and Frequency Control", Computer-Aided Design—Digest of Technical Papers, 2009. ICCAD 2009. IEEE/ACM International Conference on, IEEE, Piscataway, NJ, USA, Nov. 2, 2009, pp. 310-1-313, XP031586200, ISBN: 978-1-60558-800-1.

"QDSP6 V4: Qualoomm Gives Customers and Developers Programming Access its DSP Core," BDTI, http://www.bdti.com/InsideDSP/2012/06/21/Qualcomm.

* cited by examiner

UTILIZATION OF PROCESSOR CAPACITY AT LOW OPERATING FREQUENCIES

This application is a continuation of U.S. patent application Ser. No. 14/933,378, filed Nov. 5, 2015, which is a continuation of U.S. patent application Ser. No. 14/039,368, filed Sep. 27, 2013, now U.S. Pat. No. 9,256,276, issued Feb. 9, 2016, the content of which is hereby incorporated by reference.

TECHNICAL FIELD

Embodiments relate to processor capacity utilization at low operating frequencies.

BACKGROUND

Thermal/power limits (Thermal Design Power (TDP)) may be a factor in design and operation of a processor. Thermal/power limits may be obeyed by reduction in operating voltage of the processor. Additionally, in order to comply with the TDP, the processor including core, uncore, and graphics portion (GT), may be operated at a lower frequency than the processor's maximum frequency of operation, even when the processor is being heavily utilized. For instance, in a server, when all cores/threads are being actively utilized, the frequency of each core (or the uncore) may need to be reduced to meet thermal constraints. However, reduction of operating frequency typically lowers computing throughput of the processor.

DETAILED DESCRIPTION

Figure 1:
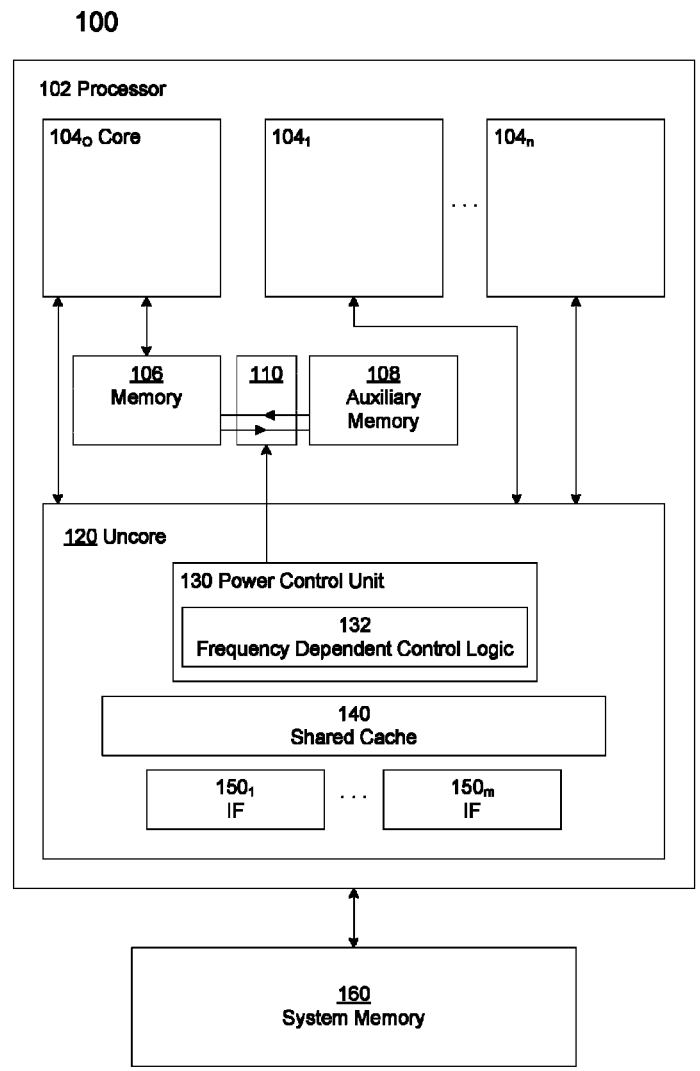
FIG. 1 is a block diagram of an apparatus that includes a reconfigurable structure, according to an embodiment of the present invention.

Processors typically have a threshold voltage of operation (minVcc) because a transistor typically does not operate reliably below the supply voltage minVcc. At minVcc, a core of the processor may be able to operate in a range of frequencies $f_1 \leq f \leq f_2$. Power (P) consumed by a core may be expressed as $P = P_{leakage} + (C_{dynamic})(f)(Vcc)^2$, where $P_{leakage}$ is power consumed due to leakage effects and $C_{dynamic}$ represents an effective capacitance of the core. In order to meet the TDP, the operating voltage of the core may be lowered to min Vcc, and additional incremental power savings may be achieved by lowering the frequency of operation f within the range $f_1 \leq f \leq f_2$.

Typically structures within the processor, e.g., memory structures such as Static Random Access Memory (SRAM) arrays that may be located in the core, uncore, or GT (integrated graphics), are accessed in one (or a few) cycles at a maximum operating frequency $f_{max}$ of the processor for computational efficiency reasons. As an example, to access a translation lookaside buffer (TLB) in one-cycle at 2 GHz, a size of the TLB may be limited to 16 entries. At an operating frequency of 2 GHz, a TLB that has 24 entries would not permit access to every entry within one cycle, e.g., in order to cover a large distance within a 24 entry TLB during one cycle, more time would need to be allotted for retrieval of data than is possible at 2 GHz.

Although a large structure may not be feasible to access at a high operational frequency, if the frequency is lowered the large structure may be able to be traversed, e.g., within the range $f_1 \leq f \leq f_2$. By lowering the frequency of operation of the processor, power/thermal savings may be realized, and the lower frequency may permit a larger structure, e.g., larger TLB, to be accessed. Each frequency of operation may permit a different size of structure to be accessed.

For example, assume that a structure S is to be accessed within one cycle, and that S can support 16 entries at frequency $f_2$ at voltage minVcc. The same structure S may be able to support more than 16 entries (e.g., 24 entries) at the frequency $f_1$ at the same voltage of minVcc. In other words, at the same voltage (minVcc), operation at low frequencies allows access to a larger structure (e.g., with more entries) during the same number of cycles. Consequently, when frequency is reduced while keeping the supply voltage constant at minVcc, a structure can support more entries (e.g., with longer wires) because, at a given voltage, a larger capacitance (longer wires) can be charged within a longer cycle time (i.e., at lower frequency).

Structures may be designed to be re-configurable. If a large structure was utilized initially, the longer wires would inhibit high frequency operation (e.g., at $f_{max}$). A reconfigurable structure may include one or more partitions so as to support more entries (longer wires) at lower frequencies and fewer entries (shorter wires) at higher frequencies. Although increasing the size of a few structures can increase the power consumption, this increase in power consumption may be smaller than an increase of power consumption of an entire core when operated at a higher frequency.

Alternatively or in addition, reduction in the frequency of operation f of the core at minVcc may permit enablement of decision logic that takes advantage of additional timing margins as a result of the reduced frequency. In an embodiment, the decision logic may gate power to a portion of the core, e.g., the gating based on an operation to be executed. For example, frequency reduction can result in increased timing margin, which may permit the decision logic to determine that first data from a first source is not needed in order to execute a next operation in an instruction queue. The decision logic can gate the power to be provided (e.g., power down) to the portion of the core that would otherwise read the first data, thus saving power that would otherwise be used in the core.

FIG. 1 is a block diagram of an apparatus 100 that includes a reconfigurable structure, according to an embodiment of the present invention. The apparatus 100 includes a processor 102 and a system memory 160, such as a dynamic random access memory (DRAM). The processor 102 may include one or more cores $104_0$, $104_1$, . . . ,$104_n$. The processor 102 may also include a memory 106 coupled to the core $104_0$, an auxiliary memory 108, a switch 110, and uncore 120 that may include a power control unit (PCU) 130, and that may include a shared cache 140, and one or more interfaces $150_0$, $150_1$, . . . $150_n$ to interface with, e.g., input/output (I/O) devices (not shown). The PCU 130 may include frequency dependent control logic 132.

In operation, the core $104_0$ may operate at an operating voltage Vcc that may be between minimum operating voltage minVcc and a maximum operating voltage maxVcc, and at a frequency of operation f between a first frequency $f_1$ (minimum frequency) and $f_{max}$ (maximum frequency). In an example, the core operates at frequency $f_{max}$ when the operating voltage is maxVcc. At the operating voltage Vcc=minVcc, the core may operate at a frequency f between the minimum frequency of operation $f_1$ and a second frequency $f_2$ that is less than $f_{max}$.

Operation parameters (e.g., Vcc, f) of the core $104_0$ may be controlled by the PCU 130, which may determine the Vcc and f for the core $104_0$ based at least in part on a thermal budget (e.g., thermal design point (TDP)) associated with the core $104_0$. The operating parameter values may also be selected by the PCU 130 based in part on an anticipated load, e.g., number and size of instructions to be executed by the core $104_0$ during a particular time period, and/or based on other factors.

In order to reduce power consumed by the core $104_0$, Vcc may be reduced to Vcc=minVcc. The frequency of operation at Vcc may be selected to be within the range $f_1 \leq f \leq f_2$. If f is selected to be in the range $f_1 \leq f < f_2$, the core $104_0$ is operating at a frequency less than $f_2$, and so there is more time available for access of additional memory locations within the same number of cycles (e.g., a given number of cycles occurs over a greater time period at $f=f_1$ than at a higher frequency such as $f=f_2$).

Frequency dependent control logic 132 may determine that, due to the lower frequency of operation at minVcc, the core $104_0$ may access auxiliary memory 108, and the frequency dependent control logic 132 may activate switch 110 to couple the auxiliary memory 108 with the memory 106. Thus, as a result of lowering the frequency of operation f (e.g., to comply with TDP, or due to a reduced load of the core $104_0$) to a value less than the highest frequency $f_2$ permitted at minVcc, access by the core $104_0$ to auxiliary memory 108 may be enabled.

There may be other possible ways to produce a re-configurable array structure (not shown in FIG. 1), including: 1) Provide two arrays, one short and one long. The shorter array may be coupled to the core at high frequencies of operation of the core and the longer array may be coupled to the core at low frequencies of operation of the core. This configuration may employ multiplexers to select an input/output from the two arrays. 2) Utilize multiple partitions and combine the partitions using, e.g., multiplexers (not shown). Use of multiple partitions may permit more than two sizes of memory, each size to be selected based on a frequency of operation of the core that is to access the memory.

There are many structures that can benefit from higher capacity (more entries), e.g., when the structures are heavily utilized by multiple threads/processes running in the system. Some exemplary structures are presented below.

1) Translation Lookaside Buffer (TLB). A TLB is generally capacity constrained, e.g., in server systems running multiple threads. One or more TLBs may be in a critical path of memory accesses, and hence a size of each TLB may be limited in order to permit fast access. Increasing a number of entries of one or more TLBs at low frequencies can boost performance.

2) Cache fill-buffers. Fill-buffers may be part of a critical path for memory access and hence may not support a large number of entries. Increasing a number of entries at low frequencies, especially when multiple simultaneous multi-threading (SMT) threads are running, can boost performance.

3) Shared queues (e.g., super-queue) in the uncore. When the system is heavily utilized by multiple threads/processes, shared queues in the uncore can become a bottleneck.

4) Core structures, such as reservation stations, re-order buffer entries, branch tables, and physical register files.

5) Caches and victim buffers. When multiple threads/processes are sharing a cache, the cache capacity per thread gets reduced. Note that L1 caches can be shared by multiple SMT threads and L2 or L3 caches can be shared by multiple cores. The number of entries (sets) in a cache may be increased at lower frequencies to compensate for the loss of cache capacity. Similarly, the size of victim buffers can be increased.

6) Buffers in memory/DRAM Controllers. When the system is under heavy load, performance may be increased by increasing shared buffers in a DRAM controller.

7) Checkpoint buffers: In structures that support checkpoints (e.g., register alias table (RAT) checkpoints), a total number of checkpoints at lower frequencies may be increased.

8) Simultaneous multithreading (SMT) shared structures. When multiple SMT threads are running on a core, some structures are shared because larger structures cannot be supported at maximum frequency. However, at lower frequencies, the size of these shared structures can be increased, which may result in an increase in SMT effectiveness.

In processors, there can be a large frequency range over which to operate at minVcc. For instance, a core can be running from 1.2 GHz to 600 MHz (or even 400 MHz) at the same voltage of minVcc. Note that the cycle time is 2 times (2×) at 600MHz, and 3× at 400 MHz, as compared with 1.2 GHz. Consequently, the buffer sizes can made as large as 2× and 3× at lower frequencies. Similarly, integrated graphics (GT) may run at frequencies from 400 MHz to 100 MHz at minVcc, which may permit up to 4× increase in buffer entries.

An example of an algorithm that can be used to increase/decrease size of a reconfigurable structure is as follows:
  If the frequency of a unit (core/uncore/GT/etc.) is to be reduced due to thermal limits, and if the load (utilization) of the unit is high, and if structure S utilization is above a "water-mark" (high threshold), increase the size of the structure S.
  Else if the frequency of a unit is to be increased due to relaxation of thermal limits, and if the frequency is to be increased beyond a frequency that a current size of S can support, decrease the size of the S.

When decreasing the size of the structure S, it may be possible to discard contents of additional entries, e.g., in cases where the contents are read-only (e.g., in a TLB or I-Cache). However, in some cases, it may be necessary to write back the data in the additional buffers before they are disabled (e.g., in a D-cache victim buffer).

Figure 2:
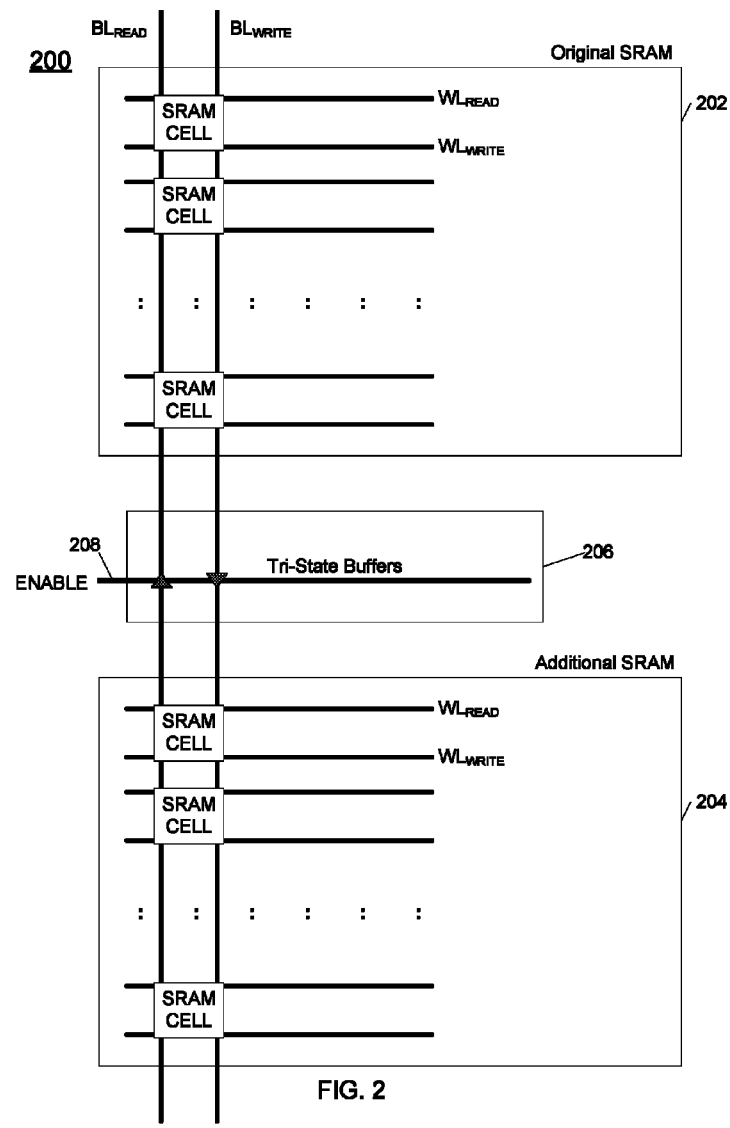
FIG. 2 is a block diagram of a reconfigurable structure, according to an embodiment of the present invention.

FIG. 2 is a block diagram of a reconfigurable structure 200, according to an embodiment of the present invention. A memory structure 202 may include a plurality of SRAM cells that are accessible via corresponding bit lines and word lines. Auxiliary memory 204 may be reversibly coupled to the memory structure 202 by activation of an enable switch 206. In an embodiment, the enable switch 206 may include tri-state buffers to reversibly couple bit lines of the auxiliary memory 204 to corresponding bit lines of the memory structure 202. The enable switch 206 may be activated by, e.g., application of an enable signal to an enable line 208 by frequency dependent control logic, such as the frequency dependent control logic 132 of FIG. 1. The enable switch 206 may be activated responsive to a reduction in frequency of operation of a core that accesses the memory structure. For example, a power control unit such as the PCU 130 of FIG. 1, may determine that the core is to operate at minVcc and at a frequency f that is less than a frequency $f_2$ (the maximum frequency at minVcc), and the frequency dependent control logic may enable access by the core to the auxiliary memory 206 via the enable switch 206. In other embodiments, word lines of the auxiliary memory 204 may also be switchable, e.g., by other tri-state buffers (not shown).

Figure 3:
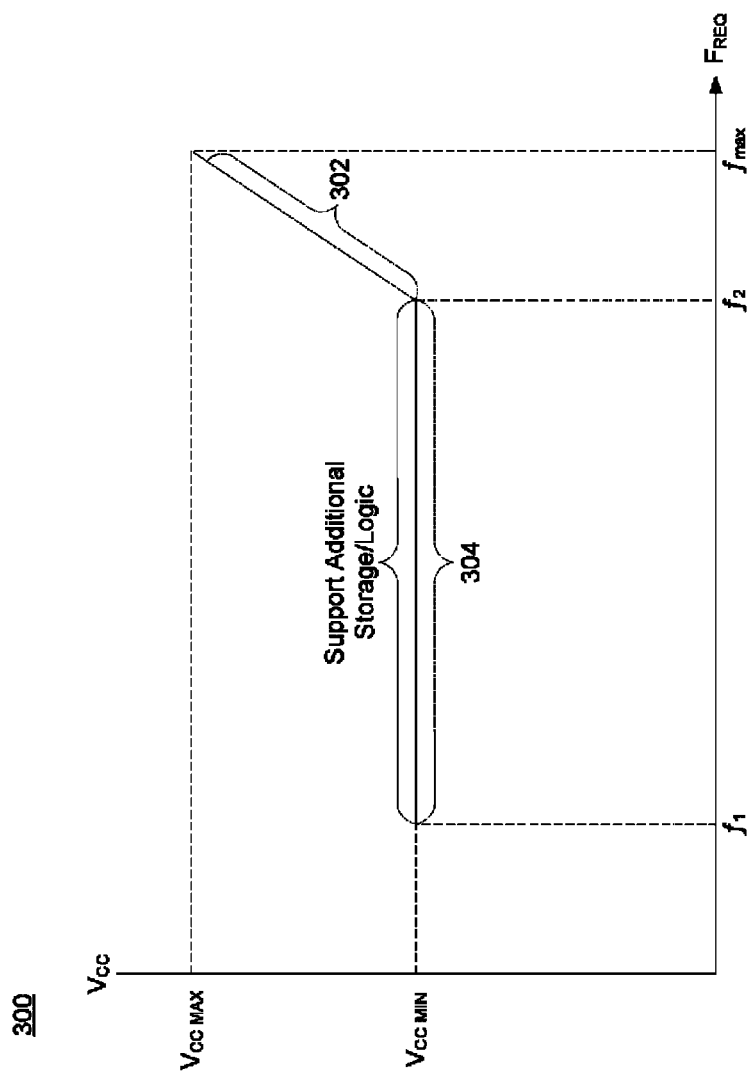
FIG. 3 is a graph of frequency of operation versus operating voltage Vcc of a core, according to embodiments of the present invention.

FIG. 3 is a graph 300 of frequency of operation f versus operating voltage Vcc of a core, according to embodiments of the present invention. In a first region 302 there is a direct relationship between Vcc and f. If Vcc is reduced to minVcc (e.g., in order to comply with TDP requirements), in a second region 304 there is a range of frequencies $f_1 \leq f \leq f_2$ for which the core is operable. The core may not be operable below Vcc=minVcc, or at a frequency less than $f_1$. Within the frequency range $f_1 \leq f \leq f_2$ operation of the core may support additional storage (more entries in structures) and/or additional decision logic (e.g., power gating logic) as compared with operation in the first region 302.

Figure 4:
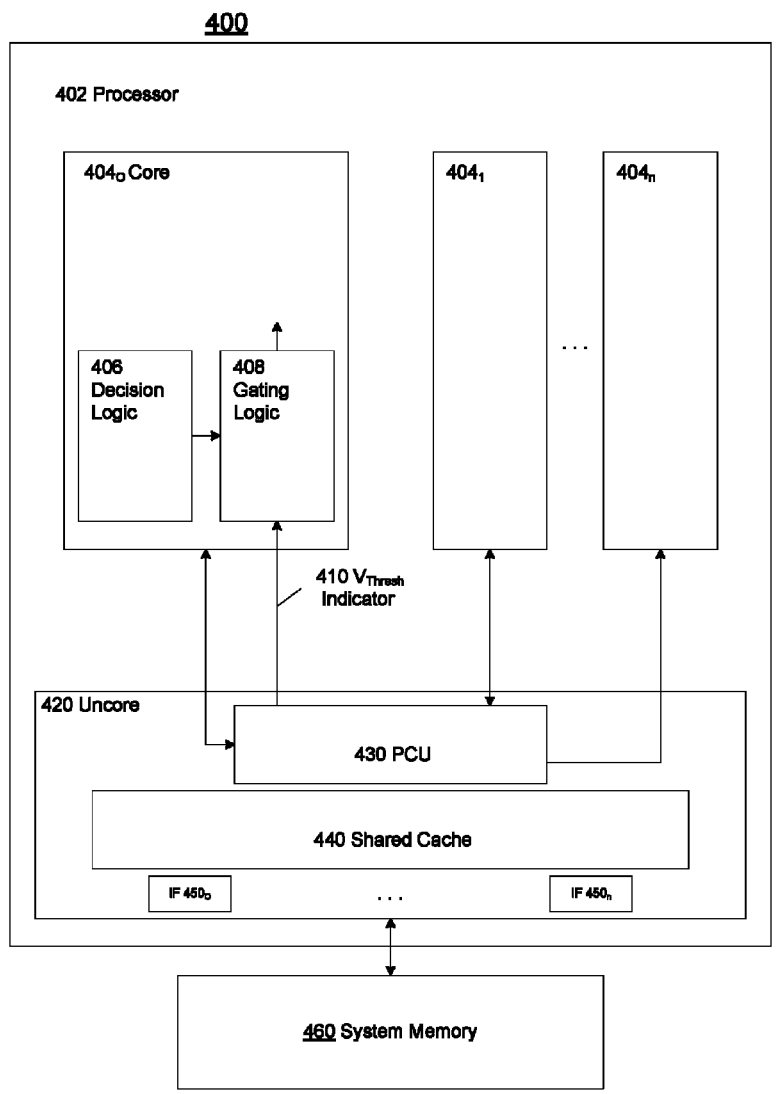
FIG. 4 is a block diagram of an apparatus, according to an embodiment of the present invention.

FIG. 4 is a block diagram of an apparatus 400, according to an embodiment of the present invention. The apparatus 400 may include a processor 402 and a system memory 460, such as a dynamic random access memory (DRAM). The processor 402 may include one or more cores $404_0$, $404_1$, . . . $404_n$. The core $402_0$ may include decision logic 406 and gating logic 408. The processor 402 may include an uncore 420 that may include a power control unit (PCU) 430. The uncore 420 may also include a shared cache 440 and one or more interfaces $450_0$, $450_1$, . . . $450_n$ to interface with, e.g., input/output (I/O) devices (not shown).

In operation, the core $404_0$ may operate at an operating voltage Vcc that may be between minimum operating voltage minVcc and a maximum operating voltage maxVcc, and at an operating frequency f between a first frequency $f_1$ (minimum frequency) and a second frequency $f_{max}$, (maximum frequency). In an example, the core operates at frequency $f_{max}$ when the operating voltage is maxVcc. At the operating voltage minVcc, the core can operate within a frequency range between the minimum frequency of operation $f_1$ and a second frequency $f_2$ that is less than $f_{max}$.

Operation parameters (e.g., Vcc and f) of the core $404_0$ may be controlled by the PCU 430, which may determine the Vcc and f for the core $404_0$ based at least in part on a thermal budget (e.g., thermal design point (TDP)) associated with the core $404_0$. The PCU 430 may also determine Vcc and f based in part on an anticipated load, e.g., number and size of instructions to be executed by the core $404_0$ during a particular time period.

In order to reduce power consumed by the core $404_0$, Vcc may be reduced to a threshold voltage, such as minVcc. The frequency of operation at Vcc may be selected to be within $f_1 \leq f \leq f_2$. At a frequency that is less than $f_{max}$, an ample timing margin may permit decision logic 406 to determine whether a particular logic portion of the core will be used in execution of a given operation, and may output a disable signal upon a determination that the particular logic portion will not be used in execution of the given operation. The decision logic 406 may provide input, e.g., a gating signal, to the gating logic 408. Another input 410 ($V_{thresh}$ indicator) may be provided by the PCU 430 to enable/disable the gating logic 408. For example, if $V_{thresh}$ is approximately equal to minVcc and if Vcc=minVcc, the gating logic 408 may be enabled to gate power to a portion of the core $404_0$ based on the input from the decision logic 406.

Figure 5:
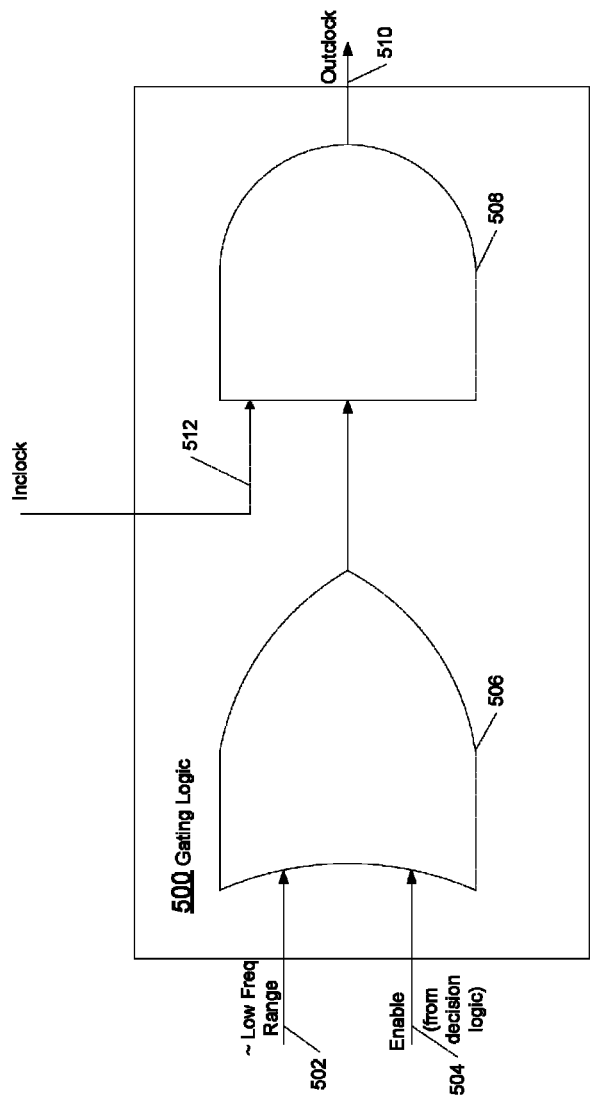
FIG. 5 is a block diagram of a portion of frequency dependent control logic, according to an embodiment of the present invention.

FIG. 5 is a block diagram of a gating logic 500, according to an embodiment of the present invention. The gating logic 500 may be situated within a core of a processor, such as the gating logic 408 in the core $404_0$ of processor 402 of FIG. 4. The gating logic 500 may include OR gate 506 and AND gate 508. In operation, an indication 502 of whether the core is operating in a low frequency range may be received from, e.g., a PCU of the processor. For example, the core may be placed at operating voltage Vcc that is less than a threshold voltage $V_{thresh}$, (e.g., Vcc=minVcc) by the PCU, and may therefore be operating at a frequency f that is less than $f_{max}$. When Vcc>$V_{thresh}$, the input 502 has a value of 1, which indicates that the core is not in the low frequency range $f_1 \leq f \leq f_2$. Therefore, an enable signal 504 (from, e.g., decision logic) will not gate inclock 512, e.g., the clock speed of the core and outclock 510 will be the same as inclock 512. Outclock 512 can be input to one or more particular portions of the core, causing the particular portions to be operable (e.g., powered up) while a next operation (e.g., in an instruction queue) is executed. When Vcc≤$V_{thresh}$ (e.g., Vcc=minVcc), the core operates in the low frequency range (e.g., $f_1 \leq f \leq f_2$) and the input 502 (~low freq. range=NOT low frequency range) has a value of 0. The output 510 will be gated by the value of the input 504 that is determined by decision logic, such as the decision logic 406 of FIG. 4. The decision logic 406 may determine that particular portions of the core may be powered down during execution of a particular operation, and the enable signal 504 may gate the outclock signal 510 causing selected logic portions of the core to power down. For example, as a result of lower operating frequency input 502 is 0 and the enable signal 504 gates the inclock 512. Depending on the value of the enable signal 504, the outclock 510 may power down selected portion(s) of the core. The enable signal 504 may be based on which operation is being executed. In an embodiment, the decision logic 406 may power-down a particular logic path of the core during execution of a first operation by the core, and may power-up the particular logic path during execution of a second operation by the core.

Figure 6:
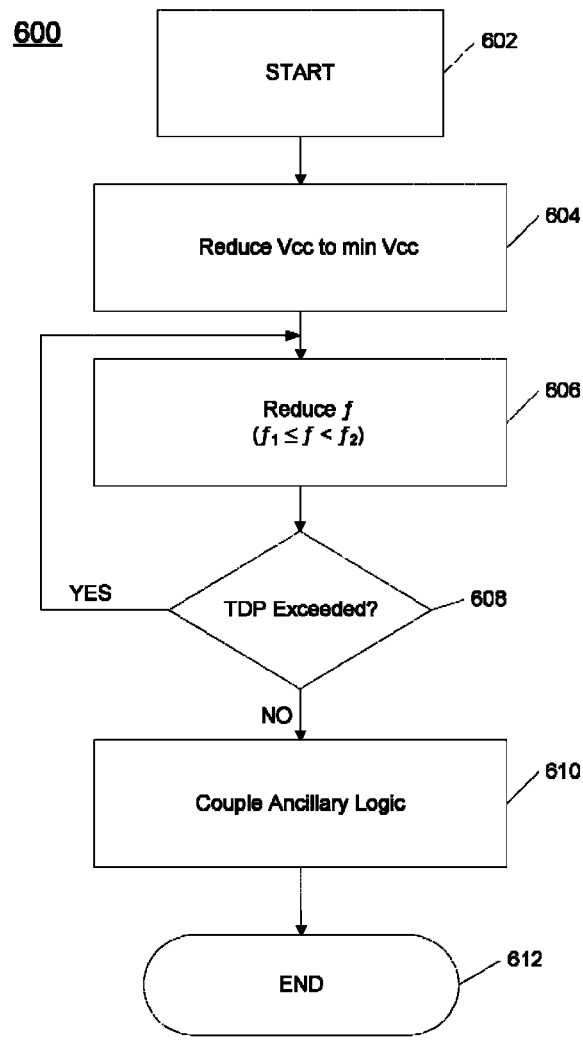
FIG. 6 is a flow diagram of a method of increasing processor performance at low operating frequencies, according to embodiments of the present invention.

FIG. 6 is a flow diagram of a method 600 of increasing processor performance at low operating frequencies, according to embodiments of the present invention. The method begins at block 602. Proceeding to block 604, operating voltage Vcc of a core is reduced to a threshold voltage $V_{thresh}$. Advancing to block 606, frequency of operation of the core is reduced. For example, for Vcc=minVcc, the operating frequency may be a value between a minimum frequency $f_1$ and a highest allowed frequency $f_2$ at minVcc, e.g., $f_1 \leq f \leq f_2$ to comply with a thermal budget (TDP) allotted to the core. Moving to decision block 608, if the thermal budget for the core is exceeded, returning to block 606 the operating frequency f of the core is reduced. Continuing to block 610, ancillary logic (e.g., gating logic or auxiliary storage) is coupled to the core. The gating logic, upon being coupled to the core, may gate power to one or more portions of the core. The auxiliary storage, upon being coupled to the core, is accessible to the core. The method ends at 612.

Figure 7:
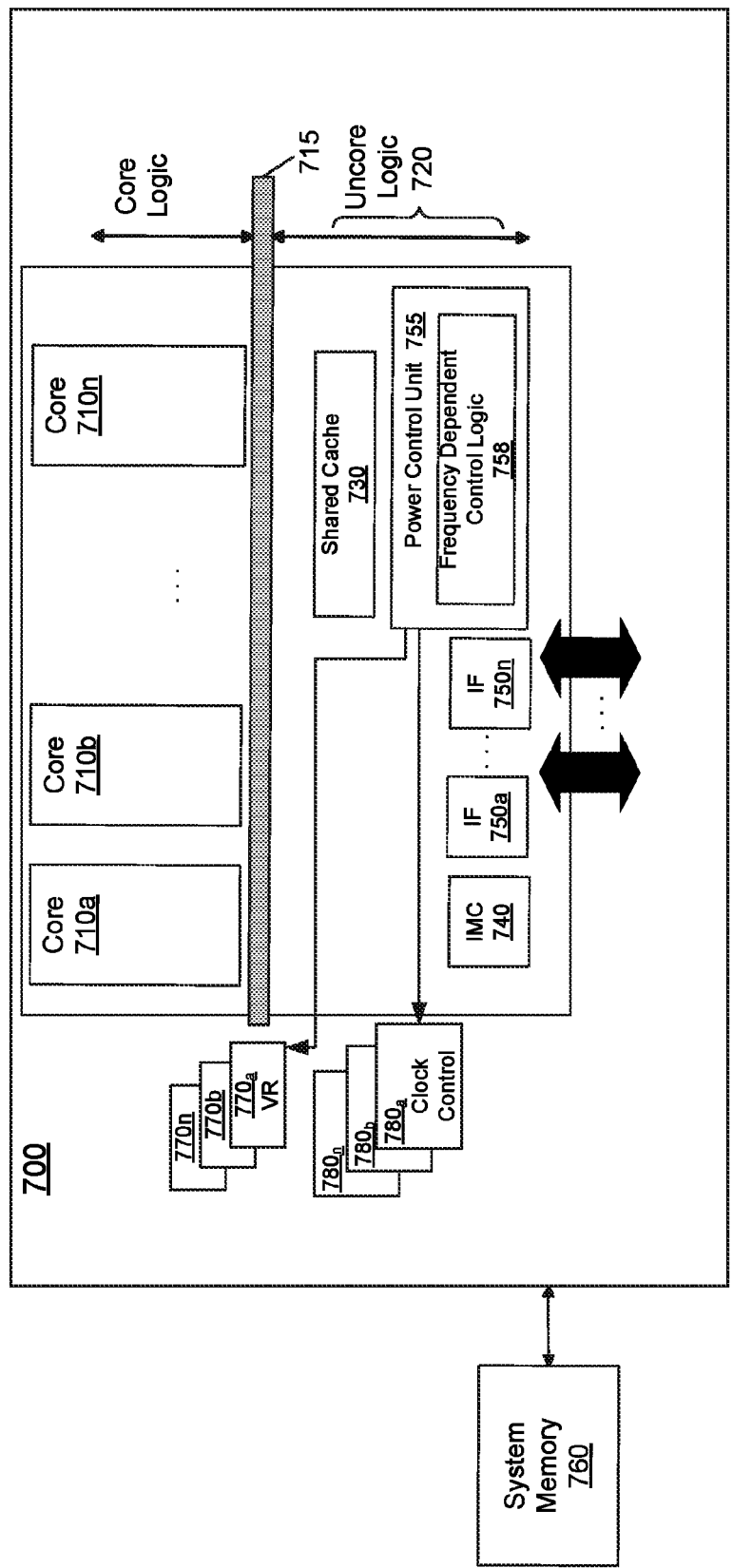
FIG. 7 is a block diagram of a processor in accordance with an embodiment of the present invention.

Referring now to FIG. 7, shown is a block diagram of a processor in accordance with an embodiment of the present invention. As shown in FIG. 7, processor 700 may be a multicore processor including a plurality of cores $710_a$-$710_n$. In one embodiment, each such core may be of an independent power domain and can be configured to operate at an independent voltage and/or frequency, and to enter turbo mode when available headroom exists. The various cores may be coupled via an interconnect 715 to a system agent or uncore 720 that may include various components. As seen, the uncore 720 may include a shared cache 730, which may be a last level cache. In addition, the uncore 720 may include an integrated memory controller 740, various interfaces 750, and a power control unit (PCU) 755. In the embodiment of FIG. 7, the power control unit 755 may be configured to determine a frequency and an operating voltage for a particular core of the cores 710a-710n. The PCU 755 may include frequency dependent control logic 758 to couple ancillary logic (e.g., enable access to auxiliary storage or to enable gating logic to gate power to portions of the core) responsive to the frequency at which a particular core is operating being in a range that is less than or equal to a frequency $f_2$ (e.g., highest operating frequency at minVcc), according to embodiments of the present invention. Also shown in FIG. 7 are voltage regulators $770a$-$770_n$ to regulate power supplied to the cores 710a-710n based on input received from the Power Control Unit (PCU) 755. Also shown in FIG. 7 are clock control units 780a-780n to provide the respective clock frequency to the respective core 710a-710n.

With further reference to FIG. 7, processor 700 may communicate with a system memory 760, e.g., via a memory bus. In addition, by interfaces 750, connection can be made to various off-chip components such as peripheral devices, mass storage and so forth. While shown with this particular implementation in the embodiment of FIG. 7, the scope of the present invention is not limited in this regard.

Figure 8:
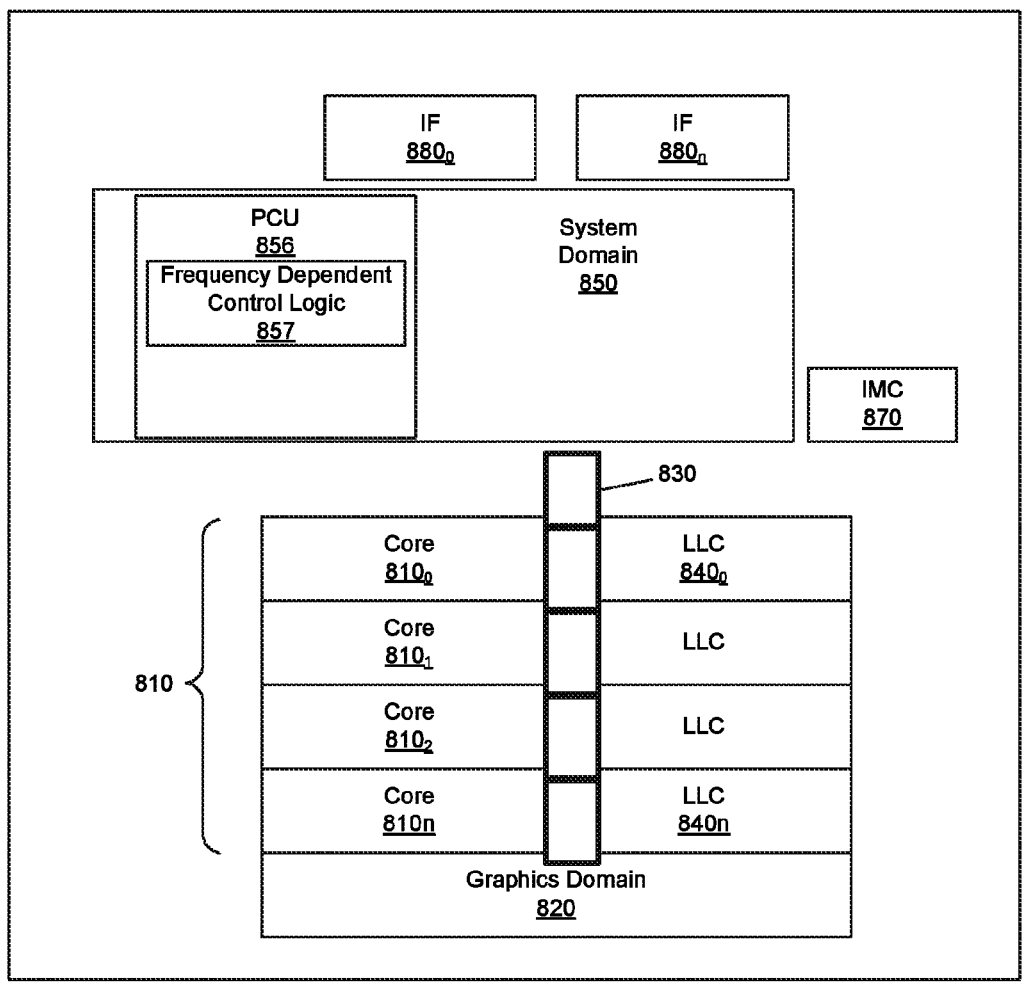
FIG. 8 is a block diagram of a multi-domain processor in accordance with another embodiment of the present invention.

Referring now to FIG. 8, shown is a block diagram of a multi-domain processor in accordance with another embodiment of the present invention. As shown in the embodiment of FIG. 8, processor 800 includes multiple domains. Specifically, a core domain 810 can include a plurality of cores $810_0$-$810_n$, a graphics domain 820 can include one or more graphics engines, and a system agent domain 850 may further be present. Note that additional domains can be present in other embodiments. For example, multiple core domains may be present each including at least one core.

In general, each core 810 may further include low level caches in addition to various execution units and additional processing elements. The various cores may be coupled to each other and to a shared cache memory formed of a plurality of units of a lower level cache (LLC) $840_0$-$840_n$. In various embodiments, LLC $840_0$-$840_n$ may be shared amongst the cores and the graphics engine, as well as various media processing circuitry. As seen, a ring interconnect 830 couples the cores together, and provides interconnection between the cores 810, graphics domain 820, and system agent circuitry 850.

As further seen, system agent domain 850 may include a power control unit (PCU) 856 to perform power management operations for the processor. In the embodiment of FIG. 8, the power control unit 856 can include frequency dependent control logic 857. Responsive to a Vcc of a core being set to value less than a threshold value $V_{thresh}$ (e.g., the core is to operate at a frequency f less than $f_{max}$.) PCU 856 may enable access by the core to auxiliary storage, or may enable gating of power to portions of the core, in accordance with embodiments of the present invention.

As further seen in FIG. 8, processor 800 can further include an integrated memory controller (IMC) 870 that can provide for an interface to a system memory, such as a dynamic random access memory (DRAM). Multiple interfaces $880_0$-$880_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with the QPI$^{TM}$ protocol may also be provided. Although shown at this high level in the embodiment of FIG. 8, understand the scope of the present invention is not limited in this regard.

Figure 9:
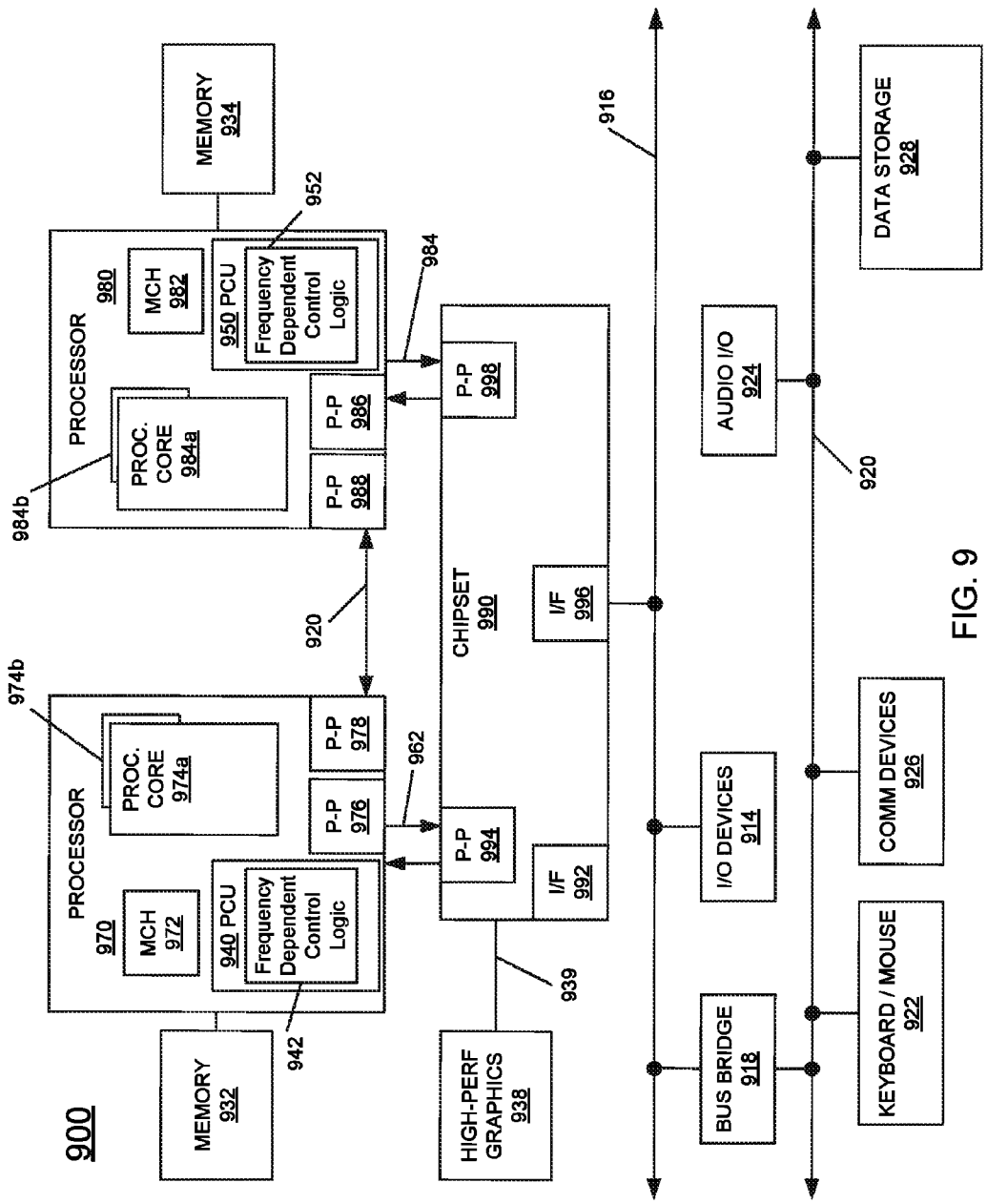
FIG. 9 is a block diagram of a system in accordance with an embodiment of the present invention.

Embodiments may be implemented in many different system types. Referring now to FIG. 9, shown is a block diagram of a system in accordance with an embodiment of the present invention. As shown in FIG. 9, multiprocessor system 900 is a point-to-point interconnect system, and includes a first processor 970 and a second processor 980 coupled via a point-to-point interconnect 920. As shown in FIG. 9, each of processors 970 and 980 may be multicore processors, including first and second processor cores (e.g., processor cores 974a and 974b, and processor cores 984a and 984b), although potentially many more cores may be present in the processors. Each of the processors 970 and 980 may include a PCU (940 and 950, respectively). Each of the PCUs 940 and 950 may include frequency dependent control logic 942 and 952 respectively, in accordance with embodiments of the present invention. Each PCU 940 and 950 may provide, responsive to a frequency reduction in a particular core of the respective processor, access to auxiliary storage or gating of power to portions of the core by decision logic, in accordance with embodiments of the present invention.

Still referring to FIG. 9, first processor 970 further includes a memory controller hub (MCH) 972 and point-to-point (P-P) interfaces 976 and 978. Similarly, second processor 980 includes a MCH 982 and P-P interfaces 986 and 988. As shown in FIG. 9, MCHs 972 and 982 couple the processors to respective memories, namely a memory 932 and a memory 934, which may be portions of system memory (e.g., DRAM) locally attached to respective processors. First processor 970 and second processor 980 may be coupled to a chipset 990 via P-P interconnects 962 and 984, respectively. As shown in FIG. 9, chipset 990 includes P-P interfaces 994 and 998.

Furthermore, chipset 990 includes an interface 992 to couple chipset 990 with a high performance graphics engine 938 by a P-P interconnect 939. In turn, chipset 990 may be coupled to a first bus 916 via an interface 996. As shown in FIG. 9, various input/output (I/O) devices 914 may be coupled to first bus 916, along with a bus bridge 918 which couples first bus 916 to a second bus 920. Various devices may be coupled to the second bus 920 including, for example, a keyboard/mouse 922, communication devices 926 and a data storage unit 928 such as a disk drive or other mass storage device, in one embodiment. Further, an audio I/O 924 may be coupled to second bus 920. Embodiments can be incorporated into other types of systems including mobile devices such as a smart cellular telephone, tablet computer, netbook, Ultrabook™, or so forth.

Figure 10:
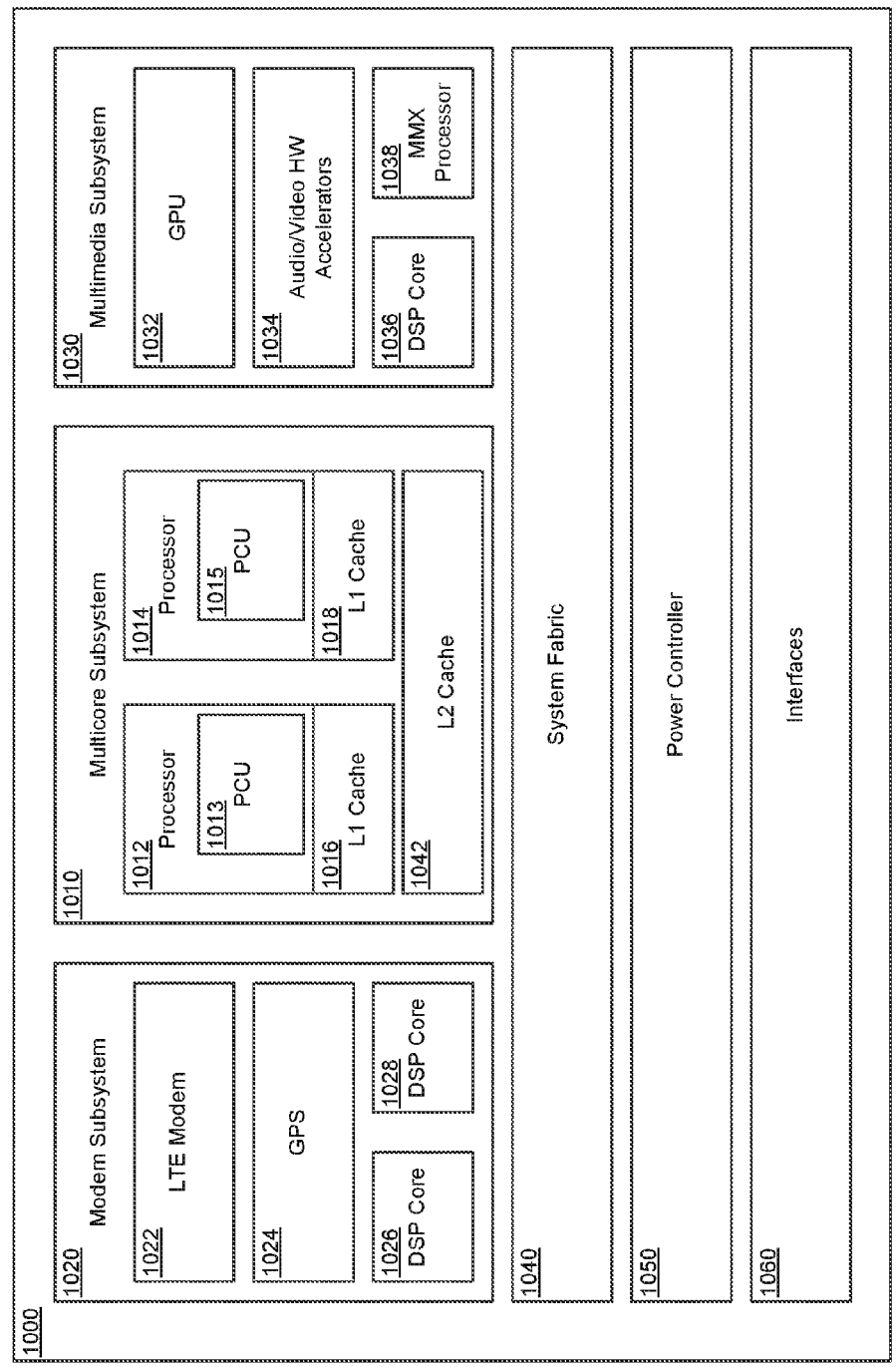
FIG. 10 is a block diagram of a system on a chip (SOC) in accordance with embodiments of the present invention.

FIG. 10 is a block diagram of a system on a chip (SOC) in accordance with embodiments of the present invention. The SOC 1000 includes a multicore subsystem 1010, a modem subsystem 1020, a multimedia subsystem 1030, system fabric 1040, a power control unit 1050, and interfaces 1060 to interface with one or more external devices. The SOC 1000 may perform multiple tasks concurrently, e.g., modem tasks, multimedia tasks, and other processing tasks.

The multicore subsystem 1010 includes multicore processors 1012 and 1014, L1 caches 1016 and 1018, and L2 cache 1042. Each of the multicore processors 1012 and 1014 may include a corresponding PCU 1013 and 1015 that may include frequency dependent control logic (not shown). The PCU 1013 and 1015 may, responsive to a reduction in frequency of a core, enable the access by the core to ancillary logic such as auxiliary storage, or may enable decision logic to gate power to portions of a core, according to embodiments of the present invention.

The modem subsystem 1020 may include a Long Term Evolution (LTE) modem 1022 for wireless communication of high speed data. The modem subsystem 1020 may also include a global positioning system (GPS) 1024, and two (or more) digital signal processor (DSP) cores 1026 and 1028.

The multimedia subsystem 1030 may include a graphics processing unit (GPU) 1032, audio/video hardware accelerators 1034, a digital signal processing core 1036, and an MMX processor 1038, which may be capable of processing, e.g., single instruction multiple data (SIMD) instructions.

The following examples pertain to further embodiments.

In a first example, a processor may include one or more cores including a first core to operate at an operating voltage between a minimum operating voltage and a maximum operating voltage. The processor may also include a power control unit including first logic to enable coupling of ancillary logic to the first core responsive to the operating voltage having a value less than or equal to a threshold voltage ($V_{thresh}$), and to disable the coupling of the ancillary logic to the first core responsive to the operating voltage being greater than $V_{thresh}$. In an embodiment, $V_{thresh}$ is approximately equal to the minimum operating voltage. In another embodiment, the ancillary logic includes an auxiliary memory. In another embodiment, the first logic includes at least one tri-state buffer switch. In another embodiment, the processor further includes a first memory coupled to the first core, and the at least one tri-state buffer switch is operable to couple the auxiliary memory to the first core by coupling the auxiliary memory to the first memory. In another embodiment, at least one tri-state buffer switch is operative to reversibly couple a first bit line of the first memory to a first bit line of the auxiliary memory. In another embodiment, at least one tri-state buffer switch is operative to reversibly enable access by the first core to a word line of the auxiliary memory. In another embodiment, the ancillary logic includes decision logic to gate power to a portion of the first core. In an embodiment, the decision logic is to determine whether to power down the portion of the first core during execution of a particular operation based on whether the portion of the first core is to be used during execution of the particular operation. In another embodiment, the power control unit further includes second logic to determine the operating voltage and a frequency f at which to operate the first core based at least in part on a thermal budget associated with the first core.

In a second example, a system includes a processor that includes at least one core including a first core to operate at an operating voltage between a minimum operating voltage and a maximum operating voltage, and switching logic to engage ancillary logic responsive to the operating voltage having a value less than or equal to a threshold voltage ($V_{thresh}$). The system also includes a dynamic random access memory (DRAM) coupled to the processor. In an embodiment, the ancillary logic includes an auxiliary memory that is engaged by coupling the first core to the auxiliary memory. In another embodiment, a first memory is coupled to the processor and the switching logic is to reversibly couple the first core to the auxiliary memory by coupling the auxiliary memory to the first memory. In an embodiment, the switching logic includes at least one tri-state buffer switch. In an embodiment, $V_{thresh}$ is approximately equal to the minimum operating voltage. In another embodiment, the switching logic is to engage the ancillary logic responsive to the operating voltage being approximately equal to the minimum operating voltage and responsive to an operating frequency f of the core having a value $f_1 \leq f < f_2$, where $f_1$ is a minimum operating frequency of the core at the minimum operating voltage and $f_2$ is a maximum operating frequency of the core at the minimum operating voltage. Upon engagement, the ancillary logic is to gate power to a portion of the core during execution of an operation based on the operation being executed.

In a third example, a machine readable medium stores instructions that, when executed by a processor, cause the processor to determine whether a core is operating at an operating voltage that is less than or equal to $V_{thresh}$ where $V_{thresh}$ is a threshold voltage. Responsive to the operating voltage being less than or equal $V_{thresh}$, the instructions cause the processor to couple ancillary logic to the core, and responsive to the operating voltage being greater than $V_{thresh}$, the instructions cause the processor to uncouple the ancillary logic from the core. In an embodiment, the ancillary logic includes an auxiliary memory. In another embodiment, upon engagement the ancillary logic is to gate power to a portion of the core during execution of an operation based on the operation being executed. In an embodiment, $V_{thresh}$ is approximately equal to a minimum operating voltage of the core. In another embodiment the ancillary logic is to gate the power to the portion of the core responsive to an operating frequency f of the core having a value $f_1 \leq f < f_2$, where $f_1$ is a minimum operating frequency of the core at the minimum operating voltage of the core and $f_2$ is a maximum operating frequency of the core at the minimum operating voltage.

In a fourth example, a method includes determining whether a core is operating at an operating voltage that is less than or equal to $V_{thresh}$, where $V_{thresh}$ is a threshold voltage. Responsive to the operating voltage being less than or equal to $V_{thresh}$, the method includes coupling ancillary logic to the core, and responsive to the operating voltage being greater than $V_{thresh}$, uncoupling the ancillary logic from the core. In an embodiment, the ancillary logic includes an auxiliary memory. In another embodiment, upon coupling the ancillary logic to the core, the ancillary logic is to gate power to a portion of the core based on an operation being executed by the core. In an embodiment, $V_{thresh}$ is approximately equal to a minimum operating voltage of the core. In another embodiment, the power is gated to the portion of the core by the gating logic responsive to an operating frequency f of the core having a value $f_1 \leq f < f_2$, where $f_1$ is a minimum operating frequency of the core at a minimum operating voltage and $f_2$ is a maximum operating frequency of the core at the minimum operating voltage.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a core to operate at an operating voltage and an operating frequency, the operating voltage between a minimum operating voltage and a maximum operating voltage;
   a first memory coupled to the core;
   a second memory; and
   a power control unit including first logic to enable the second memory to be coupled to the core when the operating frequency is less than a maximum operating frequency at the operating voltage and disable the second memory from being coupled to the core when the operating voltage exceeds a threshold voltage.

2. The processor of claim 1, wherein the core further comprises a decision logic, the first logic to enable the decision logic to be coupled to the core when the operating frequency is less than the maximum operating frequency at the operating voltage.

3. The processor of claim 2, wherein the decision logic is to gate power to a portion of the core based on an operation to be executed.

4. The processor of claim 3, wherein the decision logic is to gate power to a reader of first data when the decision logic determines that the first data is not needed to execute the operation.

5. The processor of claim 1, wherein the first logic is to enable the second memory to be coupled to the core when a utilization of the first memory exceeds a threshold.

6. The processor of claim 1, wherein the first memory and the second memory comprise static random access memory cells.

7. The processor of claim 1, wherein the first logic comprises at least one tri-state buffer switch to couple the second memory to the core via the first memory.

8. The processor of claim 7, wherein the at least one tri-state buffer switch is to reversibly couple a first bit line of the first memory to a first bit line of the second memory.

9. The processor of claim 1, wherein the power control unit is to cause the core to operate at the operating voltage less than the maximum operating voltage based at least in part on a thermal budget.

10. The processor of claim 1, wherein the first memory comprises a first partition of a memory structure of the processor and the second memory comprises a second partition of the memory structure.

11. The processor of claim 1, wherein the power control unit is to determine the operating voltage and the operating frequency for the core based at least in part on a thermal budget.

12. The processor of claim 1, wherein the power control unit further comprises decision logic to gate power to a portion of the core during execution of a particular operation based on whether the portion of the core is to be used during execution of the particular operation.

13. A system comprising:
   a processor comprising:
      a first core to operate at an operating voltage between a minimum operating voltage and a maximum operating voltage, the first core including a first cache memory;
      switching logic to increase a size capacity of the first cache memory when an operating frequency of the first core is less than a maximum operating frequency at the operating voltage and to reduce the first cache memory size capacity when the operating voltage exceeds a threshold voltage;
      a second core; and
      a shared cache memory coupled to the first core and the second core; and
   a dynamic random access memory (DRAM) coupled to the processor.

14. The system of claim 13, wherein the processor further comprises a power controller to reduce the operating frequency of the first core to less than the maximum operating frequency responsive to a thermal budget being exceeded.

15. The system of claim 13, wherein the first core further comprises a decision logic to gate power to a portion of the first core based on an operation to be executed.

16. The system of claim 15, wherein the switching logic is to enable the decision logic when the operating frequency is less than the maximum operating frequency at the operating voltage.

17. The system of claim 15, wherein the decision logic is to gate power to a reader of first data when the decision logic determines that the first data is not needed to execute the operation.

* * * * *